No. 771,791. PATENTED OCT. 4, 1904.
D. A. SCHUTT.
LAMP SOCKET.
APPLICATION FILED MAY 16, 1901.
NO MODEL. 2 SHEETS—SHEET 1.
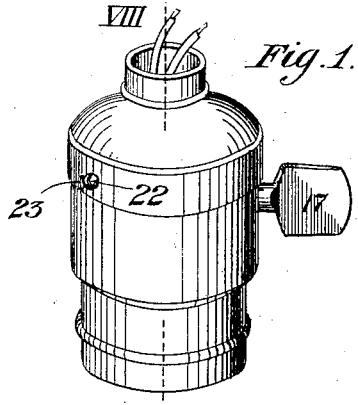
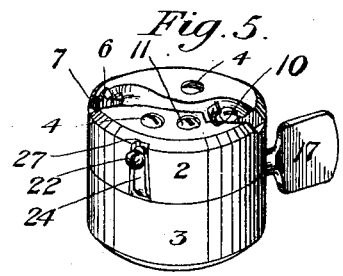
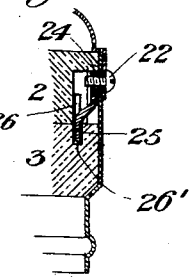
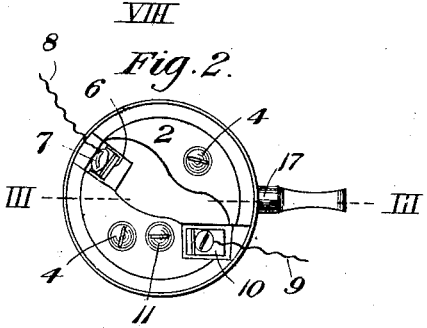
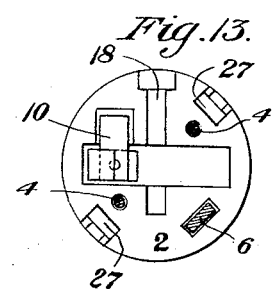
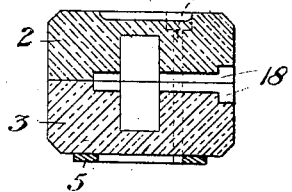
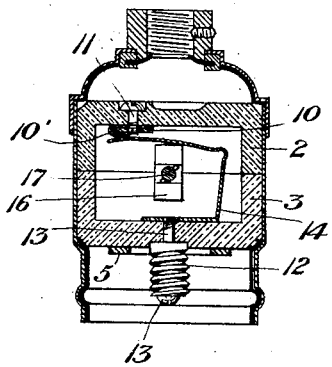
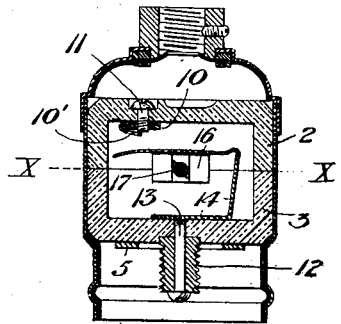
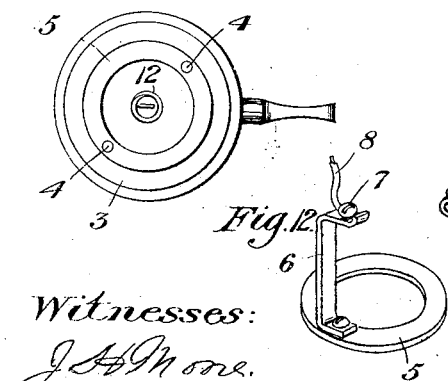
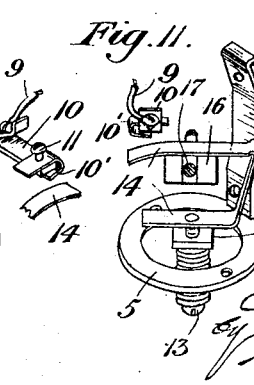
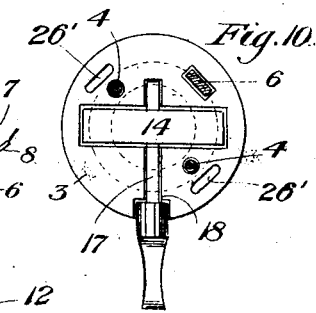
Witnesses:
J. H. Moore.
R. H. Jayman.
Inventor
Denny A. Schutt
by C. M. Clarke
his Attorney No. 771,791. PATENTED OCT. 4, 1904.
D. A. SCHUTT.
LAMP SOCKET.
APPLICATION FILED MAY 16, 1901.
NO MODEL. 2 SHEETS—SHEET 2.
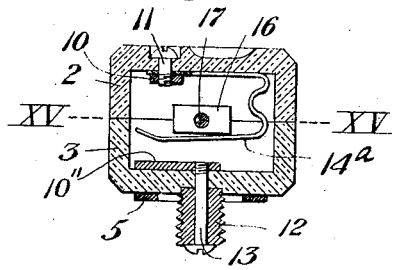
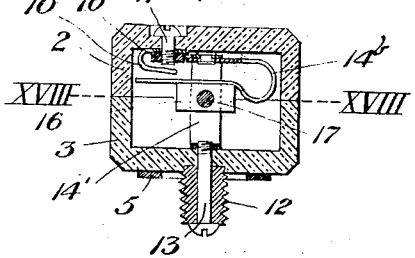
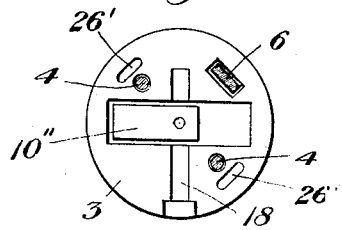
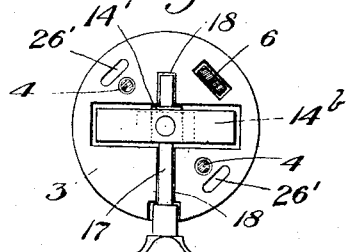
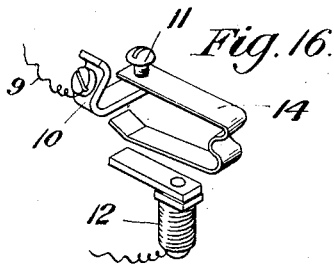
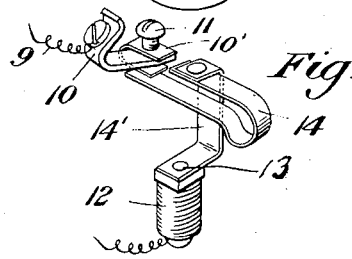
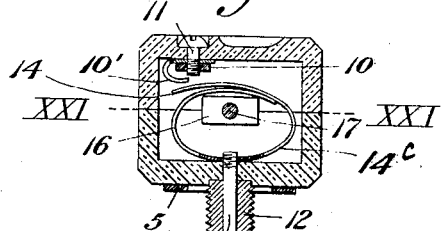
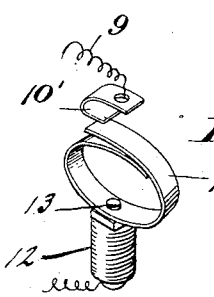
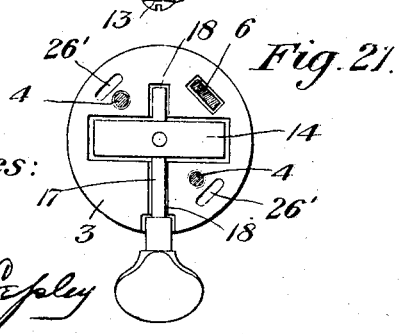
Witnesses:
E. V. Mackenzie
Chas. S. Lepley
Inventor:
Denny A. Schutt
by C. M. Clarke
his Attorney No. 771,791.

Patented October 4, 1904.

UNITED STATES PATENT OFFICE.

DUNY A. SCHUTT, OF PERU, INDIANA.

LAMP-SOCKET.

SPECIFICATION forming part of Letters Patent No. 771,791, dated October 4, 1904.

Application filed May 16, 1901. Serial No. 60,484. (No model.)

*To all whom it may concern:*

Be it known that I, DUNY A. SCHUTT, a citizen of the United States, residing at Peru, in the county of Miami and State of Indiana, have invented certain new and useful Improvements in Lamp-Sockets, of which the following is a specification, reference being had therein to the accompanying drawings, forming part of this specification, in which—

Figure 1 is a perspective view of my improved socket. Fig. 2 is a plan view of the top of the upper portion of the socket, the cap being removed. Fig. 3 is a vertical section through the upper and lower portions of the socket assembled, (indicated by line III III of Fig. 2,) the operating parts and case being removed. Fig. 4 is an under plan view of the lower base. Fig. 5 is a perspective view of the bases assembled. Fig. 6 is a sectional detail view through a portion of each member of the socket-case at the side, showing the manner in which the shell and cap are held together and to the base members by my improved retaining-piece. Fig. 7 shows such improved retaining-piece in perspective from different sides. Fig. 8 is a vertical section taken through the entire socket on the line VIII VIII of Fig. 1. Fig. 9 is a similar view showing the tumbler turned and contact established. Fig. 10 is a plan view of the lower portion of the socket of Fig. 8, the partition-line being indicated at X X. Fig. 11 indicates in perspective the terminal members and contacting device assembled and in detail. Fig. 12 is a perspective detail view of the outside connecting-ring with metallic conductor. Fig. 13 is an under plan view of the upper base member. Fig. 14 is a sectional view similar to Fig. 8, the outer casing being removed and showing a modified construction of contact-spring. Fig. 15 is a cross-section therethrough on the line XV XV. Fig. 16 is a perspective detail view of the contact-spring and its contact member of Fig. 14, the rotatable tumbler being removed. Fig. 17 is a view similar to Fig. 14, showing a further modification. Fig. 18 is a cross-sectional view therethrough on the line XVIII XVIII. Fig. 19 is a perspective detail view of the contact-spring and its contact member of Fig. 17, the rotatable tumbler being removed. Fig. 20 is a view similar to Fig. 14, showing a further modification. Fig. 21 is a cross-section therethrough on the line XXI XXI. Fig. 22 is a perspective detail view of the contact-spring and its contact member of Fig. 20, the rotatable tumbler being removed.

My invention relates to sockets for incandescent lamps, either key or keyless; and it consists of the novel construction, arrangement, and operation of the various parts, as I shall now proceed to describe.

The invention has in view to provide a socket which will be in itself a perfect insulation, with all working parts so arranged that the regulation requirements in "break" distance are complied with and the working parts and mechanism so arranged that it will open or close circuit quickly while still having in all parts the required metallic bodies to give the best results on higher voltage.

The further object of the invention is to incorporate the base members with the cap and shell in a simple and efficient manner, by which short-circuiting through these parts is prevented, by means of which the base members, the cap, and shell are connected together, so as to give better results than have heretofore been possible.

Referring now to the drawings, the body portion of the socket is composed of upper and lower base members 2 3, of porcelain or other suitable insulating material, held together with screws 4 4, passing through both members, tapping into the outside connecting-ring 5, and holding it in position. This ring is connected with an upwardly-projecting terminal branch 6, which passes through both members of the socket and to the top of which by a screw 7 one of the terminal wires, 8, is connected. The other terminal wire, 9, is connected in a similar manner to the contact-spring or to the contact member 10, which may have a supplemental contact-plate 10', and the spring or contact member is held in the inner side of one of the base members by screw 13.

It will be noted that both of the terminal members to which the connecting-wires are connected are of good size, giving full contact, and that they are located remotely from each other and deep down in the porcelain, thereby obviating any danger of short-circuiting from strands in lamp-cord, &c.

The central contact-post 12 is made of a square or other suitably-shaped bar, the upper end of which fits into a corresponding socket in the under side of the porcelain, whereby it is thus non-rotatably set in the base, while the projecting portion is turned down and threaded or left plain, as desired, for the insertion of the lamp-base. This post is drilled centrally, and a screw 13 passes up through the post, porcelain, and into the contact-spring 14, which by the screw is clamped tightly down against the inner base of the lower post and by which means electrical connection is established with the post 12 by turning tumbler 16 on stem 17, as in Fig. 9. In the construction shown in Fig. 14 the screw 13 binds post 12 to the stationary contact member 10″, the spring 14ª being connected by screw 11 to the attaching contact member 10. The spring 14ª is turned around over itself and forms a good bearing for the whole face of the tumbler 16, mounted on the stem 17, which stem is of usual construction, mounted in bearings 18, formed in the meeting faces of the base members 2 3, which bearings are made sufficiently accurate to maintain the stem in alinement independent of any auxiliary bearings. As thus constructed it will be seen that contact will be made between spring 14ª and the contact member 10″ by turning the stem, when the flat end of the tumbler will come into contact with the flat spring 14ª underneath, establishing a good electrical contact and resting firmly in place either in a make or break position. In this construction (illustrated in Fig. 14) the position of the spring 14ª is reversed from the construction shown on Sheet 1, the spring being secured to contact member 10, while the screw 13 taps into the supplemental contact-plate 10″, which construction is substantially the same as already described, the other features and elements being arranged in the same manner and for the same purpose. In the construction illustrated in Fig. 17 the position of spring 14ᵇ above the tumbler 16 is the same as that shown in Figs. 8 and 9; but the construction of the spring is such that its entire elastic portion is located above the tumbler, the spring being attached to the upper end of a downwardly-extending supporting-arm 14′, into which screw 13 taps, so as to hold the spring rigidly in position and establish with it electric communication from the threaded post 12. In the construction shown in Fig. 20 the spring 14ᶜ is bowed around upon itself and doubled over the top of the tumbler 16, so that upon rotating the tumbler the spring will be forced up into contact with the contact member 10′, which contact, as are the constructions shown in Figs. 17 and 20, is the same as has already been described as to the other constructions. It will be observed that in all of these forms the elements correspond to each other and that electrical contact is established by rotation of the tumbler between the threaded stem 12 and the terminal attaching device 10 in substantially the same manner. All of these constructions are very compact. The number of parts is limited. The operation is the same and in continuous service will give good results.

The outer shell and cap are attached together, and both are connected with the base members by screw 22, which pass through slotted bayonet-jointed openings 23 in the cap and shell and tapped into the upper bent-out extremity 24 of elongated retaining-nuts 25, the extremity 24 being forced outwardly from the upper middle body portion of a flat plate, the extremity 24 being narrower than the plate itself, whereby laterally-retaining lips 26 are left on each side and form continuations of the main plate portion. The narrower extremity 24, as will be seen, thus projects outwardly beyond the face of the portion 25, which portion is inserted into a corresponding depressed socket 26′ in the lower base member of each side, while above such socket is formed in the upper base member on each side a T-shaped slotted opening 27, in the lateral cavity of which are inserted the lips 26, which are thereby retained therein, while the upper extension 24 projects outwardly through the central opening of the slot, so that its outer face is on substantially the same level with the outer rounded surface of the upper insulating member 2. The screw 22 passes through the bayonet-jointed openings 23 and is tapped in the upper extremity, thus binding the parts closely together, and an especial advantage of such construction is in the facility with which the joint is made by reason of the elasticity of the extension 24 and the corresponding ease with which the various parts are incorporated together by reason of such flexibility. The retaining-nut is seated in the lower and upper cavity, as I have described, and the openings are made of sufficient size to permit of a limited range of movement, and a further advantage of this construction is that it permits the extension 24 to come out to proper binding position with all variations of porcelain or brasses, so as to at all times make an elastic pressure against both shell and cap to hold these parts in proper relative position. A further advantage is that the lips 26 being in alinement with the main body portion 25 and having a large range of vertical movement in the base members thereby serve to keep such base members in alinement, while also permitting the nut members to be moved up or down in proper relation to the interfitting shell and cap quite independent to any variation that may occur in the porcelain. These features of advantage are valuable and will be readily appreciated by those familiar with the construction of this class of devices. As thus constructed the metallic holding-nuts are situated remotely from the interior working parts, being embedded in the insulating-bases and providing a strong, reliable, and simple means for connecting the parts together. By loosening screw 22 the cap and shell may be removed, while the screw and its nut are retained in position against accidental dislodgment or loss, and this feature will be found to be of great advantage and value in devices of this class, as it entirely avoids the necessity of supplemental insulating mediums, as inner linings, &c.

The advantages of my invention will be appreciated by those skilled in the art. All danger of short-circuiting is prevented by reason of all of the metal working parts being entirely inclosed in the interior of the insulating-bases, which are hollowed out to provide for location and operation. The manner of connecting the base members with the cap and shell are new and useful.

The device is very simple, cheap, and easily constructed and very durable and efficient in operation and will commend itself to the makers and users of this class of devices.

Having described my invention, what I claim is—

1. In a lamp-socket provided with base members of insulating material and surrounding overlapping shells; a holding device for the shells, consisting of an elongated plate, adapted to be inserted in a socket in one of the bases, having lateral lip extensions adapted to be inserted in a socket in the other base member, and provided with an outwardly-pressed middle extension, adapted to project through a slot in the base member, substantially as set forth.

2. In a lamp-socket provided with base members of insulating material and surrounding overlapping shells; a holding device for the shell, consisting of an elongated plate, adapted to be inserted in a socket in one of the bases, having lateral lip extensions adapted to be inserted in a socket in the other base member, and provided with an outwardly-pressed middle extension adapted to project through a slot in the base member, and a screw passing through bayonet-joint openings in the shell and tapped into the said outwardly-pressed middle extension, substantially as set forth.

3. In a lamp-socket, the combination of upper and lower base members of insulating material, a contacting ring on the lower base provided with a current-terminal embedded in the bases, a threaded center post having a base inserted in the lower side of the lower base, a connecting-screw passing centrally through the center post and base into a contact-spring, a contact-spring so connected and in electrical connection with the screw, an upper contact provided with a connecting-terminal embedded in the upper base, a turning stem and tumbler mounted in the bearing-recesses formed in the meeting faces of the base members and adapted to establish electrical communication between the upper terminal and the contact-spring, surrounding upper and lower overlapping shells, holding devices for the shells consisting of elongated flat retaining-nuts adapted to be inserted in sockets in the base members, having outwardly-pressed middle extensions adapted to project through slots in the upper base member, and screws passing through bayonet-joint openings in the shell and tapped into such extensions binding the parts together, substantially as set forth.

4. The combination, with insulating-bases and shells therefor, of a holding device consisting of a plate having lateral lip extensions and an outwardly-pressed middle portion provided with a retaining-screw tapped into its extremity and adapted to bind the parts together, substantially as set forth.

In testimony whereof I affix my signature in presence of two witnesses.

DUNY A. SCHUTT.

Witnesses:
WM. B. McCLINTIC,
R. H. DOURLOG.